United States Patent
Rajauria et al.

(10) Patent No.: US 12,283,293 B2
(45) Date of Patent: Apr. 22, 2025

(54) MEASURING LASER DIODE TEMPERATURE AND PREDICTING MODE HOPS USING LASER DIODE RESISTANCE

(71) Applicant: Western Digital Technologies, Inc., San Jose, CA (US)

(72) Inventors: Sukumar Rajauria, San Jose, CA (US); Erhard Schreck, San Jose, CA (US); Dongying Li, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/447,517

(22) Filed: Aug. 10, 2023

(65) Prior Publication Data
US 2025/0006220 A1  Jan. 2, 2025

Related U.S. Application Data

(60) Provisional application No. 63/510,382, filed on Jun. 27, 2023.

(51) Int. Cl.
| | | |
|---|---|---|
| *G11B 5/00* | (2006.01) | |
| *G01K 7/16* | (2006.01) | |
| *G11B 5/02* | (2006.01) | |

(52) U.S. Cl.
CPC .......... *G11B 5/02* (2013.01); *G01K 7/16* (2013.01); *G11B 2005/0021* (2013.01)

(58) Field of Classification Search
CPC ... G11B 27/36; G11B 5/00; G11B 2005/0021; G11B 11/105; G11B 5/54; G11B 5/58
USPC .......................................................... 360/59
See application file for complete search history.

(56) References Cited

U.S. PATENT DOCUMENTS

| | | | |
|---|---|---|---|
| 6,226,114 B1 | 5/2001 | Ashkeboussi et al. | |
| 8,675,455 B1 * | 3/2014 | Krichevsky | G11B 5/314 360/59 |
| 8,861,124 B1 | 10/2014 | Finot et al. | |
| 9,031,103 B2 | 5/2015 | Castillo et al. | |
| 9,074,941 B1 | 7/2015 | Krichevsky et al. | |
| 9,281,659 B1 | 3/2016 | Tatah et al. | |

(Continued)

FOREIGN PATENT DOCUMENTS

CN  101841128 B  7/2012

OTHER PUBLICATIONS

Deng et al., "Temperature Distribution and Thermal Resistance Analysis of High-Power Laser Diode Arrays", International Journal of Heat and Mass Transfer, 2019, pp. 41-50, vol. 134.

(Continued)

*Primary Examiner* — Nabil Z Hindi
(74) *Attorney, Agent, or Firm* — NOD Law PC

(57) ABSTRACT

A data storage device may include a disk, an actuator arm assembly comprising a magnetic recording head, a laser diode, and one or more processing devices configured to: initiate a write operation, wherein the write operation is associated with a first temperature of the laser diode; measure a resistance of the laser diode, wherein the resistance corresponds to a temperature of the laser diode; detect, based at least in part on measuring the resistance, a change in the temperature of the laser diode relative to the first temperature; and in response to detecting the change, adjust the temperature of the laser diode during the write operation.

19 Claims, 10 Drawing Sheets

(56) References Cited

U.S. PATENT DOCUMENTS 9,472,229 B1   10/2016  Yang et al.
9,595,288 B1    3/2017  Chu et al.

OTHER PUBLICATIONS

Lee et al., "Transient Thermal Measurement of Laser Diodes", Electric Components and Technology Conference, 1998, pp. 1427-1430, Published in: US.

\* cited by examiner

MEASURING LASER DIODE TEMPERATURE AND PREDICTING MODE HOPS USING LASER DIODE RESISTANCE

CLAIM OF PRIORITY UNDER 35 U.S.C. § 120

The present Application for Patent claims priority to Provisional Application No. 63/510,382 entitled "MEASURING LASER DIODE TEMPERATURE AND PREDICTING MODE HOPS USING LASER DIODE RESISTANCE" filed Jun. 27, 2023, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some cases, laser diodes in Heat Assisted Magnetic Recording (HAMR) drives are susceptible to temperature-induced mode hopping, for instance, during the start of a write operation. During HAMR write, the temperature of a laser diode (LD) may increase (e.g., by 10-20 degrees C.), and several mode hop critical temperatures may be crossed during this temperature transient. In some circumstances, one or more mode hop events may be triggered during this transient phase, which may adversely impact write performance. For example, mode hop events during a HAMR write operation may result in recording non-uniformities, which degrades HAMR recording performance. Additionally, during certain drive operations (e.g., seeking between tracks, servo sector crossings), the LD temperature may drop, which causes subsequent mode hops to be more prominent.

In some cases, the temperature of the laser diode is linked or associated with the resistance of the laser diode. Broadly, aspects of the present disclosure are directed to measuring the resistance ($R_{LD}$) of the laser diode, which in turn allows the temperature of the laser diode to be estimated/measured in real-time or substantially real-time during operation of the disk drive. In this way, mode hops can be predicted by detecting changes in the resistance ($R_{LD}$) of the laser diode and/or the temperature of the laser diode. Furthermore, mode hop prediction may allow the laser diode temperature to be varied (e.g., in response to detecting a change in temperature) such that the laser diode temperature is maintained within a temperature range that is not associated with (or has reduced likelihood of) mode hops.

In some aspects, the techniques described herein relate to a data storage device, including: a disk; an actuator arm assembly including a magnetic recording head; a laser diode; and one or more processing devices configured to: initiate a write operation, wherein the write operation is associated with a first temperature of the laser diode; measure a resistance of the laser diode, wherein the resistance corresponds to a temperature of the laser diode; detect, based at least in part on measuring the resistance, a change in the temperature of the laser diode relative to the first temperature; and in response to detecting the change, adjust the temperature of the laser diode during the write operation.

In some aspects, the techniques described herein relate to a data storage device, wherein the one or more processing devices are configured to measure the resistance of the laser diode in real-time or substantially real-time.

In some aspects, the techniques described herein relate to a data storage device, wherein the temperature of the laser diode is based at least in part on a voltage across the laser diode and a laser current flowing through the laser diode.

In some aspects, the techniques described herein relate to a data storage device, wherein the resistance of the laser diode is based at least in part on a laser current flowing through the laser diode.

In some aspects, the techniques described herein relate to a data storage device, wherein the one or more processing devices are further configured to determine self-heating induced by the laser diode for one or more of a transient condition and a steady-state condition of the laser diode.

In some aspects, the techniques described herein relate to a data storage device, wherein, during the steady-state condition, the first temperature corresponds to a steady-state temperature associated with the write operation and when the laser diode is in a lasing state.

In some aspects, the techniques described herein relate to a data storage device, wherein, during the transient condition, the temperature of the laser diode is different from the first temperature, wherein the first temperature corresponds to a steady-state temperature associated with the write operation.

In some aspects, the techniques described herein relate to a data storage device, wherein adjusting the temperature includes adjusting the temperature of the laser diode to prevent encountering one or more mode hops during the write operation.

In some aspects, the techniques described herein relate to a data storage device, further including a preamplifier, and wherein prior to initiating the write operation, the one or more processing devices are configured to: apply, using the preamplifier, a reverse bias to the laser diode to preheat the laser diode such that the temperature is at or near the first temperature; control transition of the preamplifier from applying the reverse bias to applying a forward bias to the laser diode; and wherein a temperature of the laser diode is configured to stay the same or substantially the same after controlling the transition from the reverse bias to the forward bias for the laser diode.

In some aspects, the techniques described herein relate to a data storage device, wherein, when the reverse bias is applied to the laser diode, the laser diode is in a non-lasing state, and no data writing or rewriting occurs.

In some aspects, the techniques described herein relate to a data storage device, wherein applying the reverse bias includes applying a negative voltage, and wherein a value of the negative voltages is kept below an avalanche or breakdown voltage for the laser diode.

In some aspects, the techniques described herein relate to a data storage device, wherein the data storage device includes a heat assisted magnetic recording (HAMR) data storage device, and wherein the one or more processing devices further include a system on chip (SoC), and wherein the one or more processing devices are further configured to: calibrate firmware (FW) to allow measurement of the resistance of the laser diode, adjustment of the temperature of the laser diode, or a combination thereof.

In some aspects, the techniques described herein relate to a method of operating a data storage device, the method including: initiating a write operation, wherein the write operation is associated with a first temperature of the laser diode; measuring a resistance of the laser diode, wherein the resistance corresponds to a temperature of the laser diode; detecting, based at least in part on measuring the resistance, a change in the temperature of the laser diode relative to the first temperature; and in response to detecting the change, adjusting the temperature of the laser diode during the write operation.

In some aspects, the techniques described herein relate to a method, wherein the resistance of the laser diode is measured in real-time or substantially real-time, and wherein, the temperature of the laser diode is based at least in part on a voltage across the laser diode and a laser current flowing through the laser diode.

In some aspects, the techniques described herein relate to a method, further including: determining self-heating induced by the laser diode for one or more of a transient condition and a steady-state condition of the laser diode; and wherein: during the steady-state condition, the laser diode is in a lasing state and the temperature of the laser diode is equal to or substantially equal to the first temperature; during the transient condition, the temperature of the laser diode is different from the first temperature; and the first temperature corresponds to a steady-state temperature associated with the write operation.

In some aspects, the techniques described herein relate to a method, wherein the data storage device includes a heat assisted magnetic recording (HAMR) data storage device, the method further including calibrating firmware (FW) to allow one or more of the measurement of the resistance of the laser diode and adjustment of the temperature of the laser diode.

In some aspects, the techniques described herein relate to one or more processing devices including: means for initiating a write operation, wherein the write operation is associated with a first temperature of a laser diode of a data storage device; means for measuring a resistance of the laser diode, wherein the resistance corresponds to a temperature of the laser diode; means for detecting, based at least in part on measuring the resistance, a change in the temperature of the laser diode relative to the first temperature; and in response to detecting the change, means for adjusting the temperature of the laser diode during the write operation.

In some aspects, the techniques described herein relate to one or more processing devices including: means for measuring a resistance of a laser diode, wherein the resistance corresponds to a temperature of the laser diode of a data storage device; means for detecting, based at least in part on measuring the resistance, a change in the temperature of the laser diode relative to a first temperature; and in response to detecting the change, means for adjusting the temperature of the laser diode.

In some aspects, the techniques described herein relate to a data storage device, wherein the one or more processing devices are configured to measure the resistance of the laser diode when the magnetic recording head is flying over a disk surface of the disk.

In some aspects, the techniques described herein relate to a data storage device, wherein the one or more processing devices are configured to measure the resistance of the laser diode when the magnetic recording head is parked on a ramp of the data storage device.

In some aspects, the techniques described herein relate to a data storage device, wherein the temperature of the laser diode is higher when the magnetic recording head is on the ramp as compared to when the magnetic recording head is flying over the disk surface.

In some aspects, the techniques described herein relate to a method, further including measuring the resistance of the laser diode when the magnetic recording head is flying over a disk surface of the disk.

In some aspects, the techniques described herein relate to a method, further including measuring the resistance of the laser diode when the magnetic recording head is parked on a ramp of the data storage device.

In some implementations, adjusting the temperature includes adjusting the temperature of the laser diode to prevent encountering one or more mode hops during the write operation.

As used herein, the term "write operation" in this disclosure encompasses various write scenarios, including, but not limited to, writing data on one or more sectors, where the writing may be on the same track or on different tracks requiring seek of the head among tracks.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1A:
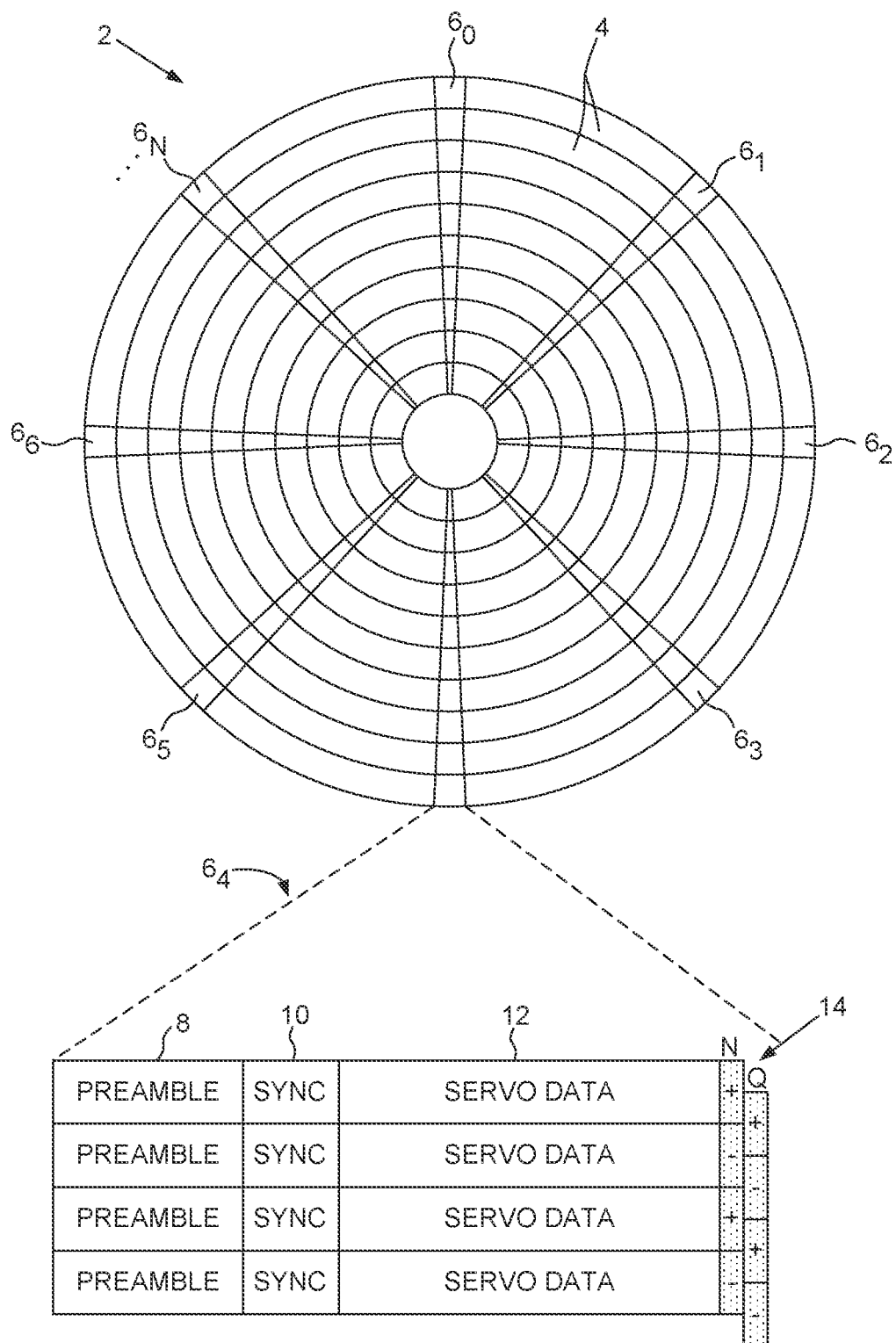
FIG. 1A shows a disk format as comprising a number of radially-spaced, concentric servo tracks defined by servo wedges recorded around the circumference of each servo track, according to various aspects of the present disclosure.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

In some cases, laser diodes in Heat Assisted Magnetic Recording (HAMR) drives are susceptible to temperature-induced mode hopping, for instance, during the start of a write operation. During HAMR write, the temperature of a laser diode may increase (e.g., by 10-20 degrees C.), and several mode hop critical temperatures may be crossed during this temperature transient. In some circumstances, one or more mode hop events may be triggered during this transient phase, which may adversely impact write performance. For example, mode hop events during a HAMR write operation may result in non-uniformities in recording, which degrades HAMR recording performance. As such, accurate knowledge of the laser diode temperature can facilitate in enhancing disk drive performance by predicting, and thereby avoiding, mode hops.

Currently used techniques for estimating laser diode temperature are lacking in several regards, most notably their accuracy in making real-time measurements. For example, some prior art techniques estimate a delta or change in laser diode temperature based on signals received from the near field transducer (NFT) temperature sensor (NTS) or embedded contact sensor (ECS). Typically, however, the ECS/NTS signal is dominated by heat generated from one or more of the NFT, thermal fly-height control (TFC) element, and writer, as opposed to the laser diode. Some aspects of the present disclosure may help alleviate some of the issues of prior art techniques by directly estimating/measuring the temperature of the laser diode using its resistance, as described in further detail below.

Broadly, aspects of the present disclosure are directed to estimating/measuring the temperature of a laser diode by measuring its resistance, which can help predict mode hops. Mode hop prediction may allow the temperature of the laser diode to be adjusted during disk drive operation so as to avoid mode hop critical temperatures, which can help enhance HAMR recording performance.

A HAMR drive uses a laser diode (LD) to heat the media to aid in the recording process. For instance, during write operations, a forward bias power is applied to the LD. The amount of forward bias power applied is based at least in part on a steady state temperature associated with the write operation. Due to inefficiencies of electric to optical power, the laser diode also heats itself during lasing. In some cases, the LD cavity comprising the LD also heats up upon application of the forward bias power. In some circumstances, components (writer, reader, heat elements) in the slider also dissipate heat and the heat is conducted to the laser diode as the LD sub mount is mounted on the slider. These components (including the laser diode) may experience significant heating due to light absorption and electric-to-optical conversion inefficiencies as energy produced by the laser diode is delivered to the magnetic recording medium (e.g., disk surface). During a write operation, these light absorption and inefficiencies may cause the junction temperature of the LD to vary, which in turn may cause a shift in laser emission wavelength, leading to a change of optical feedback from optical path in the slider to the cavity of the laser diode, a phenomenon that is known to lead to mode hopping/power instability of the laser diode. In some circumstances, mode hopping is particularly problematic for lasers utilized in HAMR drives. In some instances, a LD employed in a HAMR drive may operate in one resonator mode (e.g., emit light having a first wavelength) for some time, but then suddenly switch to another mode (e.g., emit light with a second wavelength, where the emitted light may have a different magnitude than the light emitted at the first wavelength) herein referred to as "mode hopping." In some cases, a temperature change of the LD may result in mode hopping.

In some cases, the HAMR head of a disk drive may be affected by one or more heat sources. Some non-limiting examples of such heat sources include one or more of a heater associated with a TFC element or slider, a writer coil, an NFT, a reader or reading element, and the laser diode. From an electrical standpoint, laser diodes are relatively inefficient devices. In one non-limiting example, for HAMR recording, laser diode electrical dissipation in the read/write head may be anywhere between 20-60 mW, for instance, 30-50 mW. Additionally, the power dissipation in the media (e.g., magnetic recording medium, such as the disk surface) may be around 5-10 mW. In some cases, this dissipated heat may lead to an increase in laser diode temperature. Furthermore, when the laser diode temperature changes (e.g., increases), the length of the laser diode cavity may change, resulting in mode hops. As noted above, mode hops may refer to instances where there is a discrete change in optical power output by the laser diode. Mode hops may contribute to disturbances in the media temperature, which can adversely affect HAMR recording performance. Some aspects of the present disclosure are directed to a technique for measuring laser diode temperature, which can assist in predicting mode hops. In some cases, mode hop prediction may help enhance disk drive performance by enabling the laser diode temperature to be changed during HAMR recording. In some embodiments, the laser diode temperature may be changed upon detecting a change in laser temperature and identifying that the temperature change may result in a mode hop. In this way, mode hop prediction may allow the laser diode temperature to be maintained within a temperature range that is not associated with any mode hops (or has reduced likelihood of experiencing mode hop(s)). In some cases, the laser diode temperature may be estimated or measured using the resistance, $R_{LD}$, of the laser diode.

In some cases, the resistance, $R_{LD}$, of the laser diode may be based at least in part on a voltage, $V_{LD}$, applied across the laser diode and a current, $I_{LD}$, flowing through the laser diode. In some instances, the current, $I_{LD}$, may also be referred to as the injection current. Some aspects of the present disclosure allow the resistance, and accordingly, the temperature, of the laser diode to be measured when the laser is in either of a lasing or non-lasing state, HAMR writing is ON, magnetic recording head is flying over the disk surface, magnetic recording head is parked on a ramp of the data storage device, etc. It should be noted that, the resistance and/or temperature of the laser diode may be estimated/measured in real-time or substantially real-time, which allows the laser diode temperature to be dynamically varied upon detecting a change in its temperature and/or resistance, thus preventing or reducing the likelihood of mode hops during a write operation, as compared to the prior art. In some cases, the laser diode resistance may be utilized to extract the self-heating induced by the laser diode for both transient and steady-state temperatures. As used herein, the term "transient temperature" may refer to a varying temperature of the laser diode, for instance, when the temperature of the laser diode changes as it transitions from a non-lasing state to a lasing state or vice-versa. Additionally, the term "steady state temperature" may refer to a constant or substantially constant temperature of the laser diode, for instance, a temperature associated with a HAMR write operation. Furthermore, the term "write operation" in this disclosure may encompass various write scenarios, including one or more sectors, either on the same track, or alternatively, on different tracks requiring seek of the head between the different tracks.

In some cases, the resistance of the laser diode may be dependent on the laser diode voltage ($V_{LD}$) and the laser current ($I_{LD}$) and may be calculated using Ohm's law (i.e., $V_{LD}=I_{LD} \times R_{LD}$). In some instances, the laser diode resistance ($R_{LD}$) is highly dependent on the temperature of the laser diode. Accordingly, the temperature of the laser diode can be estimated/measured using the determined laser diode resistance.

In some cases, the laser diode voltage (e.g., forward bias) is inversely proportional to the temperature of the laser diode, for instance, when the current flowing through the laser diode is below a laser threshold current. In other words, for a constant laser current, the laser diode voltage decreases as the temperature increases. In some cases, a linear fit curve (or another applicable curve) may be calculated by plotting laser diode voltage ($V_{LD}$) against temperature for a constant laser diode current (e.g., laser current=3 mA, 5 mA, 7 mA, 10 mA, to name a few non-limiting examples). Furthermore, a sensitivity of the laser diode can be calculated for that laser current, where the sensitivity may be expressed in units of volts/degrees Celsius. In one non-limiting example, the sensitivity, e.g., when laser current=5 mA, may be at around 2.7 mV/C. In some cases, the terms "sensitivity" and "temperature coefficient" may be used interchangeably throughout the disclosure.

Figure 1B:
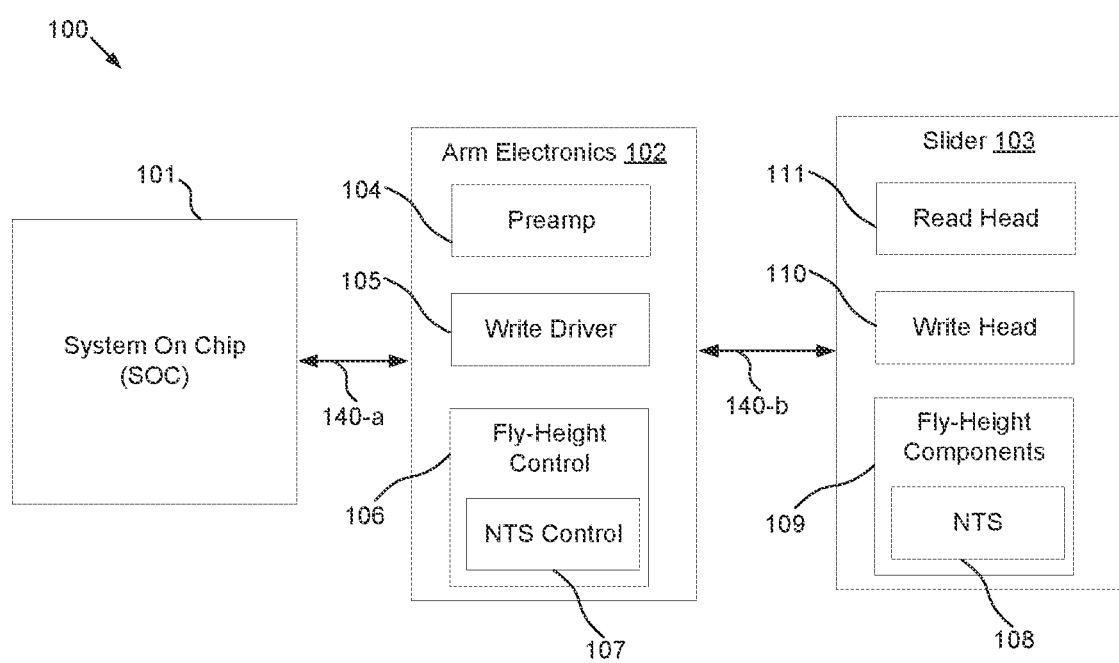
FIG. 1B shows a block diagram illustration of selected components of a disk drive, according to various aspects of the present disclosure.

Turning now to FIG. 1B, which shows a block diagram illustration of selected components of a disk drive 100, according to various aspects of the present disclosure. As a disk rotates under a slider of a hard disk drive (HDD), the slider 103 is said to "fly" above the disk. In some cases, a TFC device (e.g., heater element) can be disposed within a slider (e.g., slider 103) to contort the slider near the read and write transducers (or elements), which lowers the fly-height for the read and write transducers. In some examples, read and write elements or transducers reside in the slider of an HDD. In some cases, the disk drive 100 may comprise fly-height control circuitry 106 that interfaces with fly-height components in the slider. TFC is one prior art control technique that uses a heater element (not shown) disposed in the slider. The fly-height can be adjusted by heating the slider with the heater. Electrical current supplied to the heater by fly-height control circuitry 106 generates heat to thermally expand the slider and modulate the fly-height. The fly-height components 109 can also include other elements in addition to the heater. In some cases, the relative temperature at an air bearing surface (ABS) may be used to estimate the resistance, $R_{RTD}$, of a resistive thermal detector (RTD), such as an embedded contact sensor (ECS) or a nearfield transducer (NFT) temperature sensor (NTS). Typically, the resistance of a material can be represented as a function of its intrinsic resistance and its dimensions (e.g., length, width, thickness or height). A fly-height control system can also include NTS 108 in the slider along the associated NTS control circuitry 107 in the arm electronics (AE) 102.

A disk drive 100 according to various aspects of the disclosure, as seen in FIG. 1B, comprises a system on a chip (SoC) 101, where the SoC 101 comprises the electronics and firmware for the drive and is used to control the functions of the drive including providing power and/or control signals to the components shown in AE chip 102. Each disk (shown as disks 16A-D in FIG. 2B) can have thin film magnetic material on each of the planar surfaces. Each recording surface may comprise a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the AE chip 102, the AE 102 comprising preamps 104 (e.g., read or write preamp) for the heads (e.g., read head 111, write head 110), write driver 105, and fly-height control circuitry 106. In some examples, the fly-height control circuitry 106 includes an NTS control circuit 107, for example, when the disk drive employs HAMR. It is noted that some of the components shown in AE 102 can be implemented or partially implemented in SoC 101 according to various aspects of the disclosure.

As seen, a first connection (e.g., flex cable) 140-*a* connects the SoC 101 to the AE 102, while a second connection (e.g., flex cable) 140-*b* connects the AE 102 to the slider 103. The AE 102 typically includes digital and analog circuitry for controlling the signals sent to components in the slider 103 and processing the signals received from the slider 103 components. The AE 102 can include registers that are set using serial data from the SoC 101 to provide parameters for the AE functions. The write driver 105 may generate an analog signal that is applied to an inductive coil in the write head 110 to write data by selectively magnetizing portions of the magnetic material on the surface of the rotating disk(s) 16.

As seen, slider 103 includes write head 110 configured to write data to a disk, a read head 111 configured to read data from the disk, fly-height components 109 configured to adjust slider fly-height (as described above) and resistive temperature detector (RTD), such as NTS 108, for sensing the temperature near the ABS. It is noted that ABS is generally used to describe the surface of the slider facing the disk, where the disk drive could be filled with gases other than air (e.g., gases containing helium, hydrogen, to name two non-limiting examples) and that the use of the "ABS" term to describe various aspects of the disclosure is not intended to limit the disclosure to air filled drives. In some cases, the NTS 108 is located proximate to the ABS and write head 110 (or alternatively the read head 111). The NTS 108 facilitates detecting a temperature generated by the slider's proximity to the disk or media. In various embodiments, the NTS 108 may comprise a thermal strip (e.g., metallic or semiconductor strip) on the slider 103.

In some cases, a HAMR recording head (e.g., write head 110) also comprises optical components that direct light from a laser (or laser diode) to the disk. During recording, a write element applies a magnetic field to a heated portion of the storage medium or disk, where the heat lowers the magnetic coercivity of the media, allowing the applied field to change the magnetic orientation of the heated portion. The magnetic orientation of the heated portion determines whether a one or a zero is recorded. Thus, by varying the magnetic field applied to the magnetic recording medium while it is moving, data can be encoded onto the medium. In some cases, a HAMR drive uses an LD to heat the media to aid in the recording process. The LD is disposed within an LD cavity and is proximate to a HAMR read/write element, where the read/write element has one end on the ABS of the slider 103. The ABS faces and is held proximate to a moving media surface during operation of the HDD.

Figure 8:
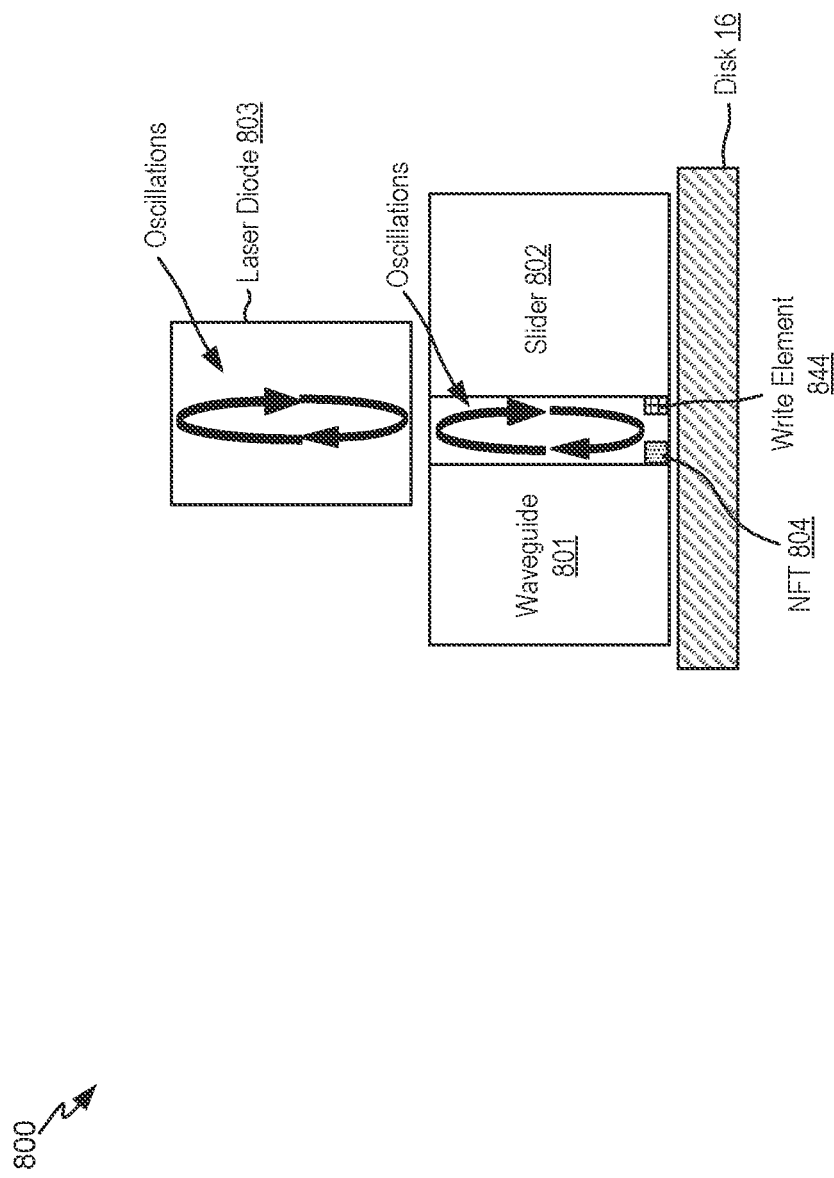
FIG. 8 illustrates a block diagram showing a waveguide, a laser diode, a disk, and a slider of a data storage device, according to various aspects of the present disclosure.

The LD (shown as laser diode 803 in FIG. 8) provides optical-based energy to heat the media surface, e.g., at a point near the read/write element. In some cases, optical path components, such as a waveguide 801, are formed integrally within the slider 802 to deliver light from the laser diode 803 to the media. For example, as shown in FIG. 8, a waveguide 801 and NFT 804 may be located proximate a write element 844 to provide local heating of the media during write operations. In some circumstances, various components (e.g., write element 844, NFT 804, LD 803, etc.) may experience significant heating due to light absorption and inefficiencies in electrical-to-optical energy conversion as energy produced by the LD 803 is delivered to the magnetic recording medium or disk 16. In some cases, for example, during the start of a write operation, track-to-track seeking, and/or sector ID crossing, the temperature of the LD experiences significant variations, causing a shift in laser emission wavelength. This in turn leads to a change of optical feedback from the optical path in the slider 802 to the LD cavity, resulting in mode hopping (i.e., power instability) of the LD 803. Mode hopping can degrade performance of HAMR drives, as mode hopping leads to shifting/jumping of laser output power and magnetic transition shifting between data blocks. Large transition shifts in data blocks may increase errors, degrading disk drive performance.

In some circumstances, mode hopping can be inadvertently introduced during a write operation, for instance, when seeking between tracks or while crossing over sector IDs to name two non-limiting examples. For instance, the preamplifier (or the control circuitry) may cease application of forward bias (FB) power to the LD as the HAMR recording head is moved from one track to another or moved over a sector ID during a write operation, which helps prevent overwriting/erasing of previously written user data and degradation/erasure of servo information. In some instances, the sector IDs may be used to store servo information utilized in seeking and track following. In some cases, however, the temperature in the LD cavity may also drop when the preamplifier stops applying power to the LD. For instance, the LD cavity temperature may deviate from the target or steady state temperature, where the steady-state temperature is associated with the write operation and when the LD is in a lasing state. In some cases, this deviation from the steady-state temperature may introduce one or more mode hops, which can adversely affect disk drive performance. In accordance with aspects of this disclosure, the resistance, and accordingly, the temperature of the laser diode may be monitored in real-time or substantially real-time, which allows the temperature of the laser diode to be varied (e.g., upon detecting a temperature change), thereby preventing or reducing the likelihood of mode hops.

Figure 2A:
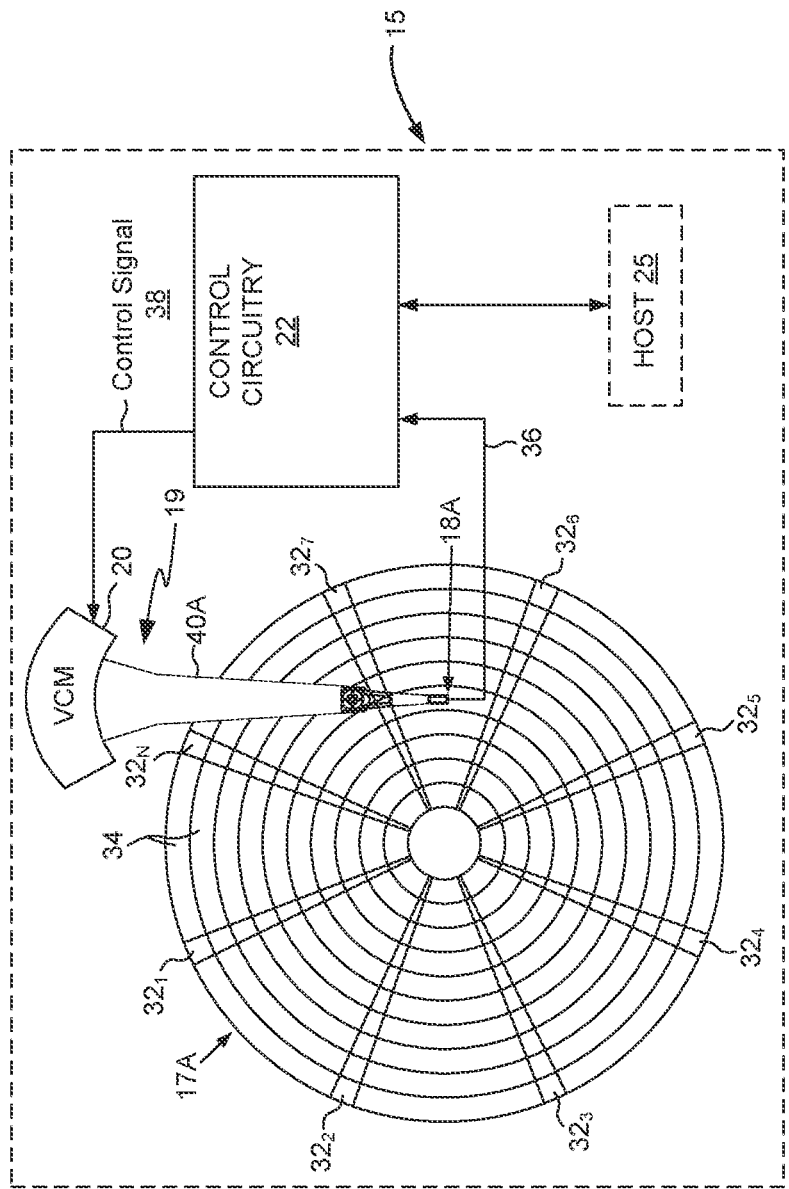
FIGS. 2A and 2B illustrate conceptual block diagrams of a top view and a side view of a data storage device in the form of a disk drive, according to various aspects of the present disclosure.
Figure 2B:
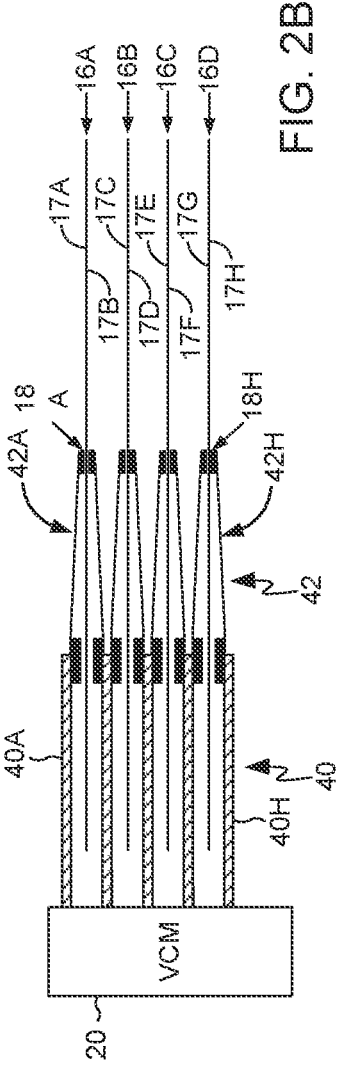
Figure 2C:
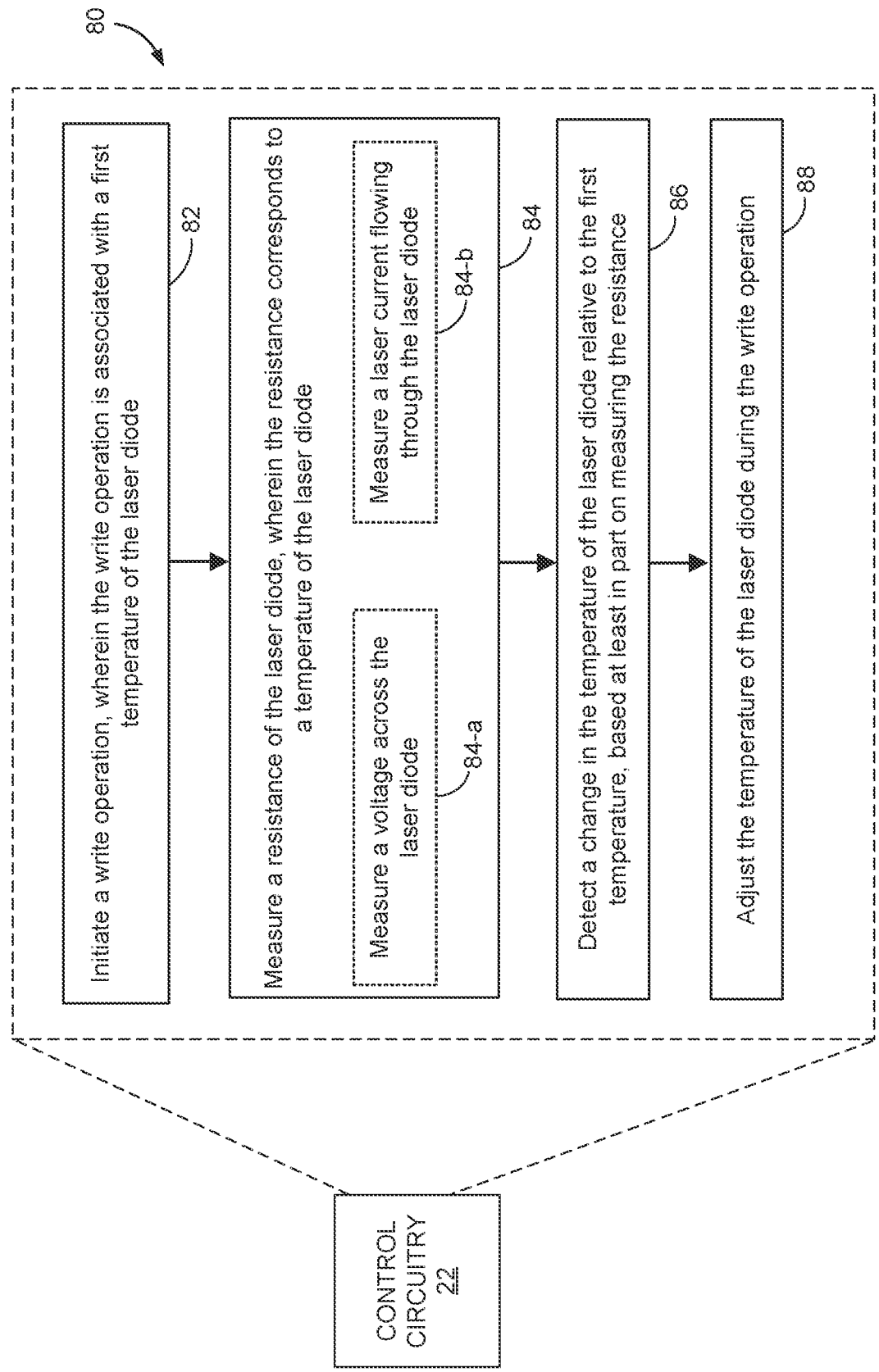
FIG. 2C illustrates a method that a data storage device may perform, execute, and implement, according to various aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 321 through 32N) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, the control circuitry 22 is configured to control the actuation of the primary actuator (i.e., VCM). Further, the VCM is configured to actuate the head 18 over the disk surfaces 17. In some examples (80), the control circuitry 22 is also configured to initiate a write operation, wherein the write operation is associated with a first temperature of the laser diode (82). Initiating the write operation (82) comprises (1) activating a magnetic recording head corresponding to the laser diode of the data storage device, and (2) applying a forward bias to the laser diode. In some cases, the laser diode is positioned inside a laser diode cavity and the forward bias is applied using a preamplifier. In some examples, the control circuitry 22 is further configured to measure a resistance of the laser diode, where the resistance is based at least in part on (or corresponds to) a temperature of the laser diode (84). In some cases, as an example, measuring the resistance comprises at least measuring a voltage or potential difference across the laser diode (84-a) and measuring a laser current flowing through the laser diode (84-b). The resistance may be determined based at least in part on the voltage and the laser current. In some cases, the method 80 further comprises detecting a change in the temperature of the laser diode (86), based at least in part on measuring the resistance. Additionally, the method 80 also comprises adjusting the temperature of the laser diode during the write operation in response to detecting the temperature change of the laser diode (88). In some instances, adjusting the temperature during the write operation, i.e., in response to detecting the temperature change, helps maintain the LD cavity at or near a steady-state or target temperature associated with the write operation. In this example, the first temperature corresponds to the steady-state or target temperature associated with the write operation.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation. In some embodiments, the BEMF voltage representing the velocity of the VCM 20 may be sampled at any suitable sample rate in order to update the feed-forward compensation at any suitable frequency during seek operations.

Figure 3:
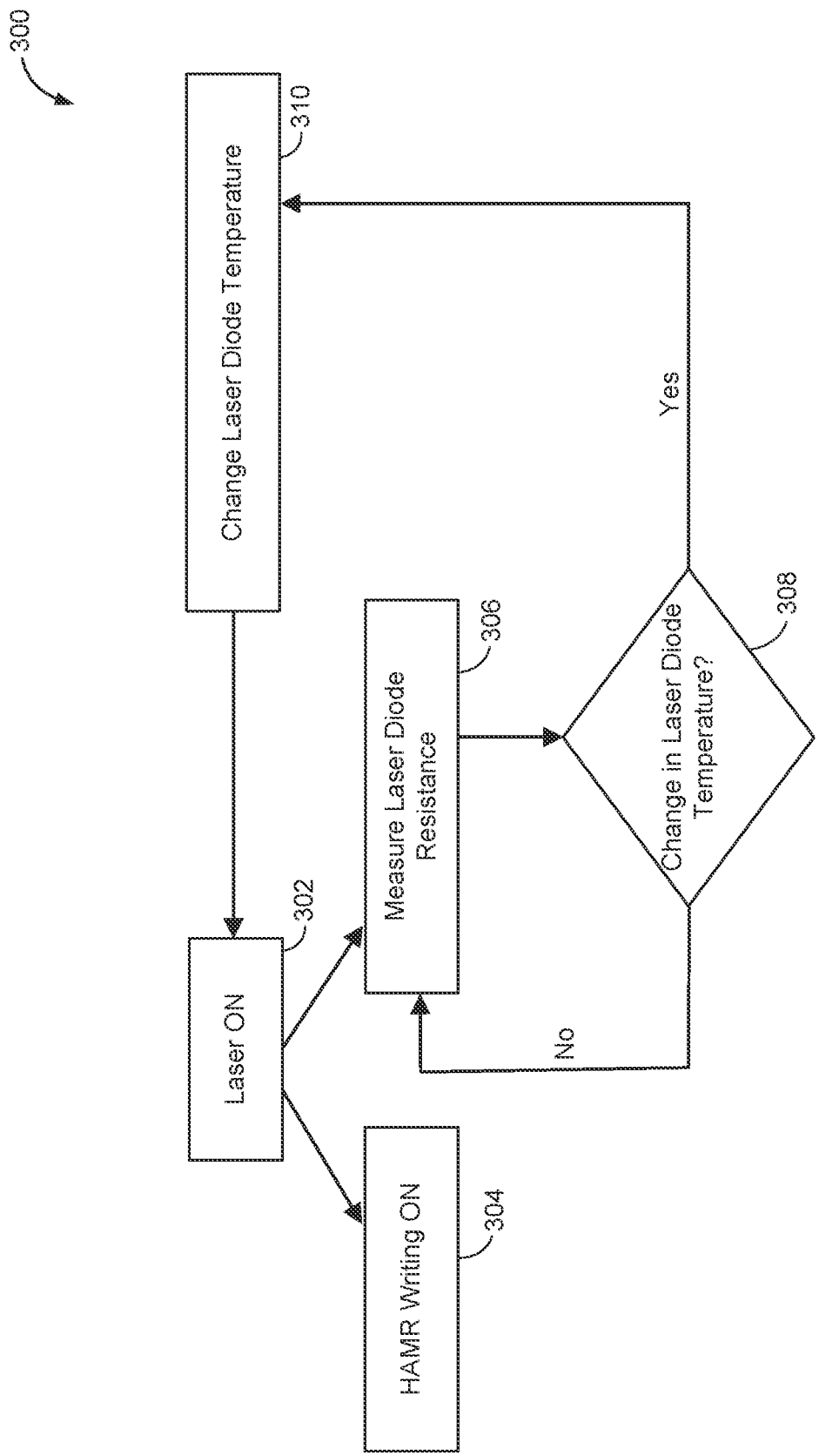
FIG. 3 illustrates another example of a method that a data storage device may perform, execute, and implement, according to various aspects of the present disclosure.

FIG. 8 illustrates a block diagram 800 showing a waveguide (WG) 801, a LD 803, a disk 16, an NFT 804, and a slider 802 of a data storage device, according to various aspects of the present disclosure. As seen, the WG 801 and the NFT 804 are located proximate a write element 844 to provide local heating of the media (i.e., disk 16) during write operations. In some cases, the LD 803 produces optical energy (e.g., having a wavelength between 700-900 nm), which is delivered to the magnetic recording medium or disk 16. In some examples, the LD 803 may be preheated prior to the start of a write operation by applying a reverse bias (or negative voltage) to the LD 803. The LD 803 may not emit laser light while the reverse bias is applied. In such cases, no data writing, rewriting, and/or erasure occurs. In this way, the LD cavity in which the LD 803 is positioned is preheated when the reverse bias is applied to the LD 803. To begin writing (or rewriting) data on the disk 16, the bias applied to the LD 803 is switched from a reverse bias to a forward bias. In some cases, the temperature of the LD 803 is configured to stay the same or substantially the same when the bias is switched to the forward bias, which serves to minimize the temperature transients, as compared to the prior art. In some aspects, reverse biasing of the LD 803 to preheat it before commencing the write operation facilitates enhanced control of the LD steady-state temperature, which helps avoid mode hops related to temperature transients at or near the start of a write operation. In some cases, the LD 803 is maintained in the pre-heat state before actually starting the write operation, which helps minimize or reduce laser-on transition time. Furthermore, during preheat, the LD temperature can be monitored by estimating/measuring its resistance, in accordance with various aspects of the disclosure FIG. 3 illustrates another example of a method 300 that a data storage device, such as the one described in relation to FIGS. 2A and 2B, may perform, execute, and implement, according to various aspects of the present disclosure. In some cases, the control circuitry 22 and/or the SoC may be configured to perform one or more of the operations described below. Additionally, or alternatively, one or more of the operations described in relation to FIG. 3 may be implemented using firmware (FW), hardware (FW), software (SW), or a combination thereof.

A first operation 302 comprises applying a forward bias to the laser diode to turn ON the laser diode, such that it is in a lasing state. A second operation 304 comprises initiating a HAMR write operation. In parallel, the method 300 also comprises measuring a resistance of the laser diode (operation 306). As noted above, the resistance of the laser diode may be dependent on the temperature of the laser diode. In some examples, aspects of the present disclosure are directed to detecting/monitoring changes in LD temperature using the LD resistance. In some embodiments, mode hops may be predicted by monitoring the LD resistance and/or LD temperature. For instance, at decision block 308, the method 300 comprises determining whether there is a change in LD temperature (e.g., determining whether LD temperature has deviated from the steady-state or target temperature associated with the write operation). If yes, the method 300 proceeds to changing the LD temperature at operation 310. If no, the method 300 returns to operation 306, and the one or more processing devices continue monitoring/measuring the LD resistance.

Figure 4:
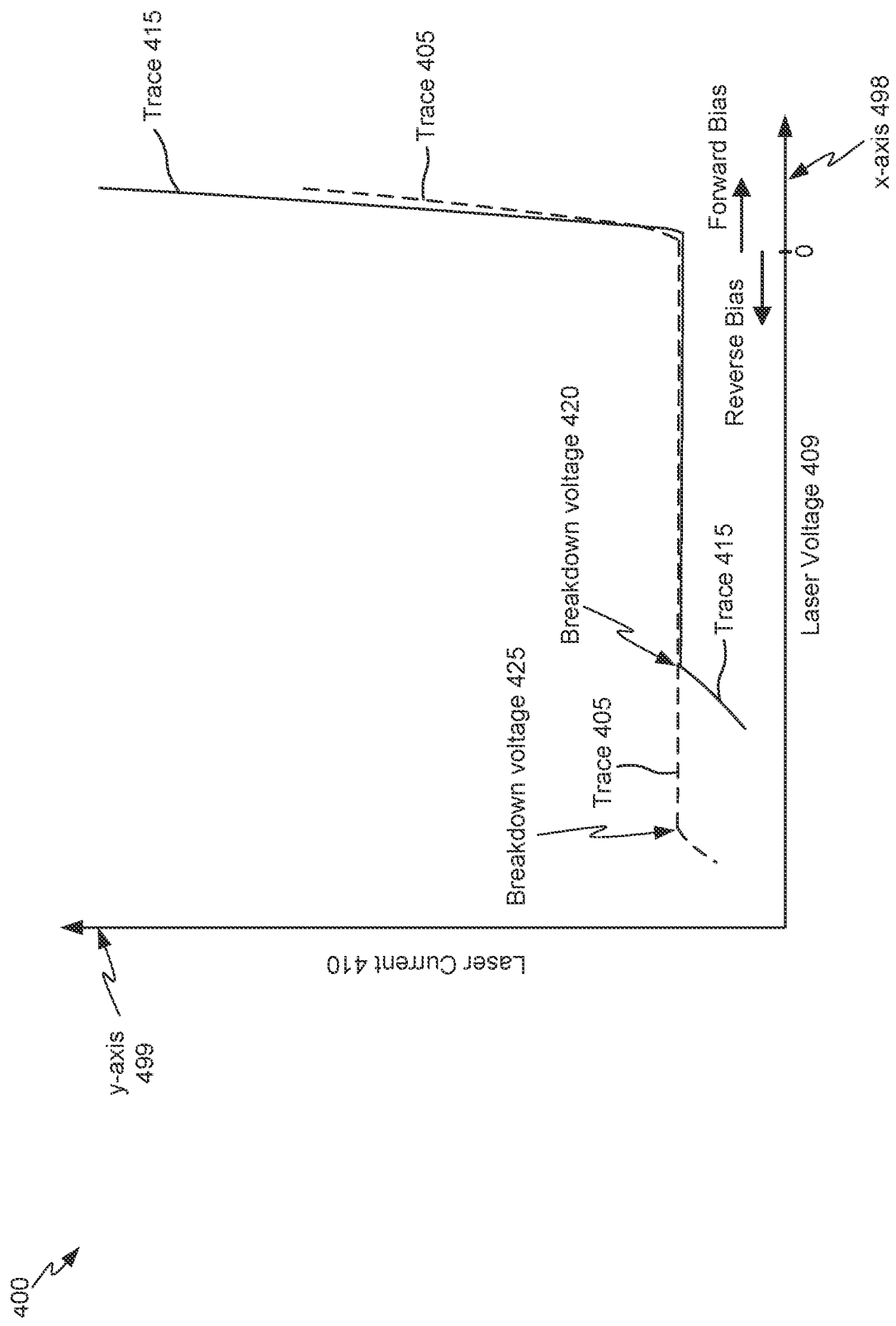
FIG. 4 illustrates a conceptual graph showing laser current against laser voltage for a laser diode of a data storage device, according to various aspects of the disclosure.

FIG. 4 illustrates a conceptual graph 400 showing laser current 410 (on the vertical or y-axis 499) against laser voltage (on the horizontal or x-axis 498) for a laser diode of a data storage device, according to various aspects of the disclosure. In this example, graph 400 depicts the I-V curves for a first laser diode (trace 405) and a second laser diode (trace 410). Here, the two laser diodes have different avalanche/breakdown voltages, shown as breakdown voltage 420 corresponding to trace 415 and breakdown voltage 425 corresponding to trace 405. As seen, when the laser diodes are forward biased, the laser current 410 rises when the laser voltage 409 increases. Additionally, when the laser diodes are reverse biased, the laser current remains constant or substantially constant before decreasing once the negative voltage (or reverse bias) exceeds the respective breakdown voltage.

In some cases, when the laser diode(s) are forward biased, the resistance of the laser diode may be dependent on the laser diode voltage 409 ($V_{LD}$) and the laser current 410 ($I_{LD}$) and may be calculated using Ohm's law (i.e., V=IR). In some instances, the laser diode resistance is highly dependent on the temperature of the laser diode. Accordingly, the temperature of the laser diode can be estimated/measured using the determined laser diode resistance.

Figure 5:
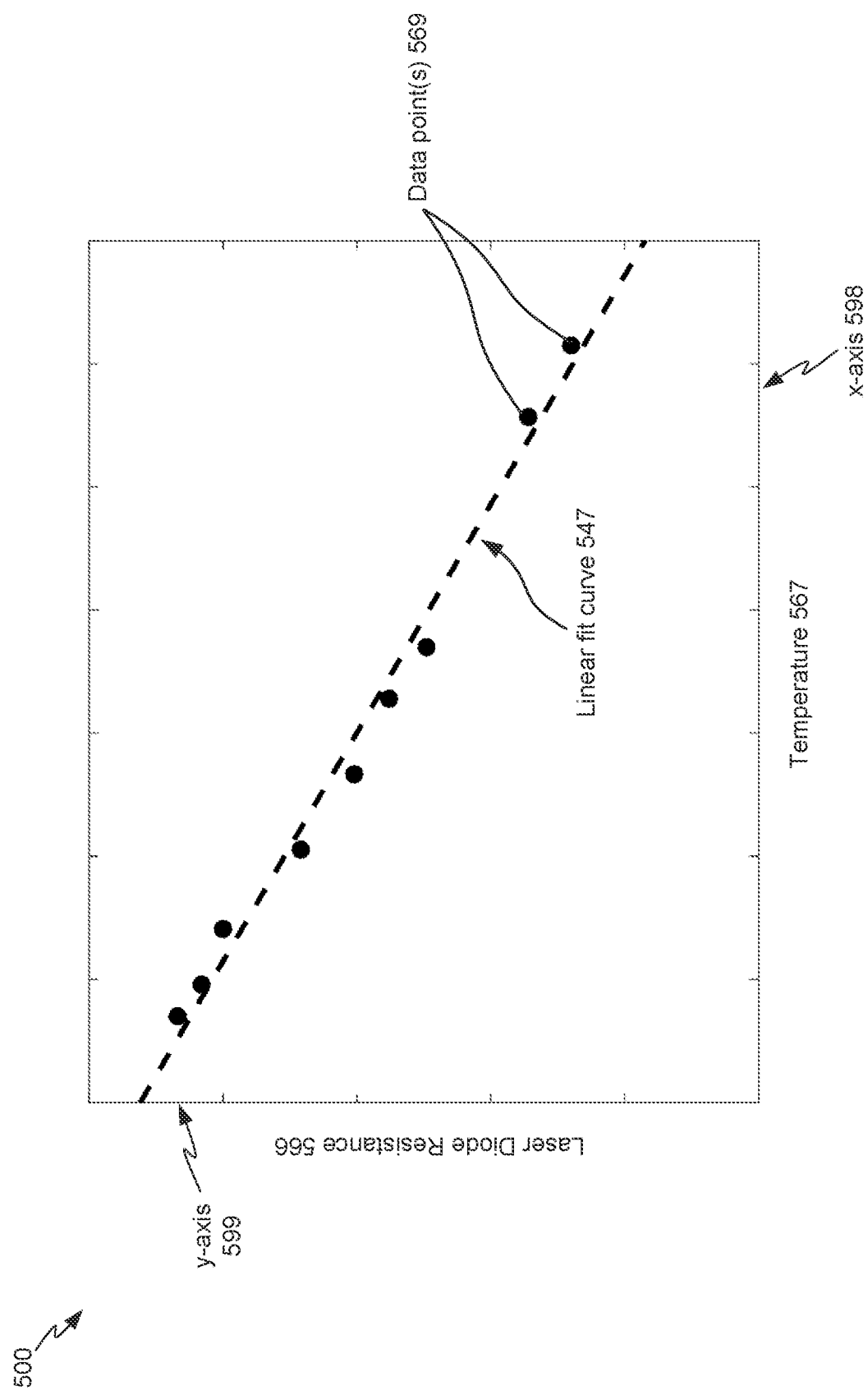
FIG. 5 illustrates a conceptual graph showing resistance of a laser diode against temperature of the laser diode during a write operation, according to various aspects of the disclosure.

FIG. 5 illustrates a conceptual graph 500 of LD resistance 566 (on the vertical or y-axis 599) against temperature 567 (on the horizontal or x-axis 598) for a laser diode of a data storage device, according to various aspects of the disclosure. Specifically, graph 500 depicts a plurality of data points 569 corresponding to LD resistance values for different LD temperatures and a linear fit curve 547 passing through one or more of the data points 569. In this example, the laser current is fixed, for instance, at a value below the laser threshold current, where the laser threshold current corresponds to a current at which the laser diode starts lasing. In other words, the laser current used to generate the datapoints 569 in FIG. 5 does not result in any optical output from the laser diode (i.e., laser is in a non-lasing state).

In some cases, the laser diode voltage (e.g., forward voltage) and/or laser diode resistance is inversely proportional to the temperature of the laser diode, as depicted in FIG. 5. In other words, for a constant laser current, the LD voltage and/or LD resistance decreases as the LD temperature increases. In some cases, a linear fit curve (e.g., linear fit curve 547) for a constant laser diode current (e.g., laser current=3 mA, 5 mA, 7 mA, 10 mA, to name a few non-limiting examples) may be generated by plotting datapoints 569 of LD resistance at different LD temperatures. Furthermore, the linear fit curve 547 (or another applicable curve) can be utilized to calculate the sensitivity of the laser diode at that laser current, where the sensitivity may be expressed in units of volts/degrees Celsius. In one non-limiting example, the sensitivity, e.g., when laser current=5 mA, may be at around 2.7 mV/C. It should be noted that the laser diode current and sensitivity values listed herein are exemplary only and not intended to limit the scope and/or spirit of the disclosure. That is, other laser diode current and/or sensitivity values are contemplated in different embodiments.

Figure 6:
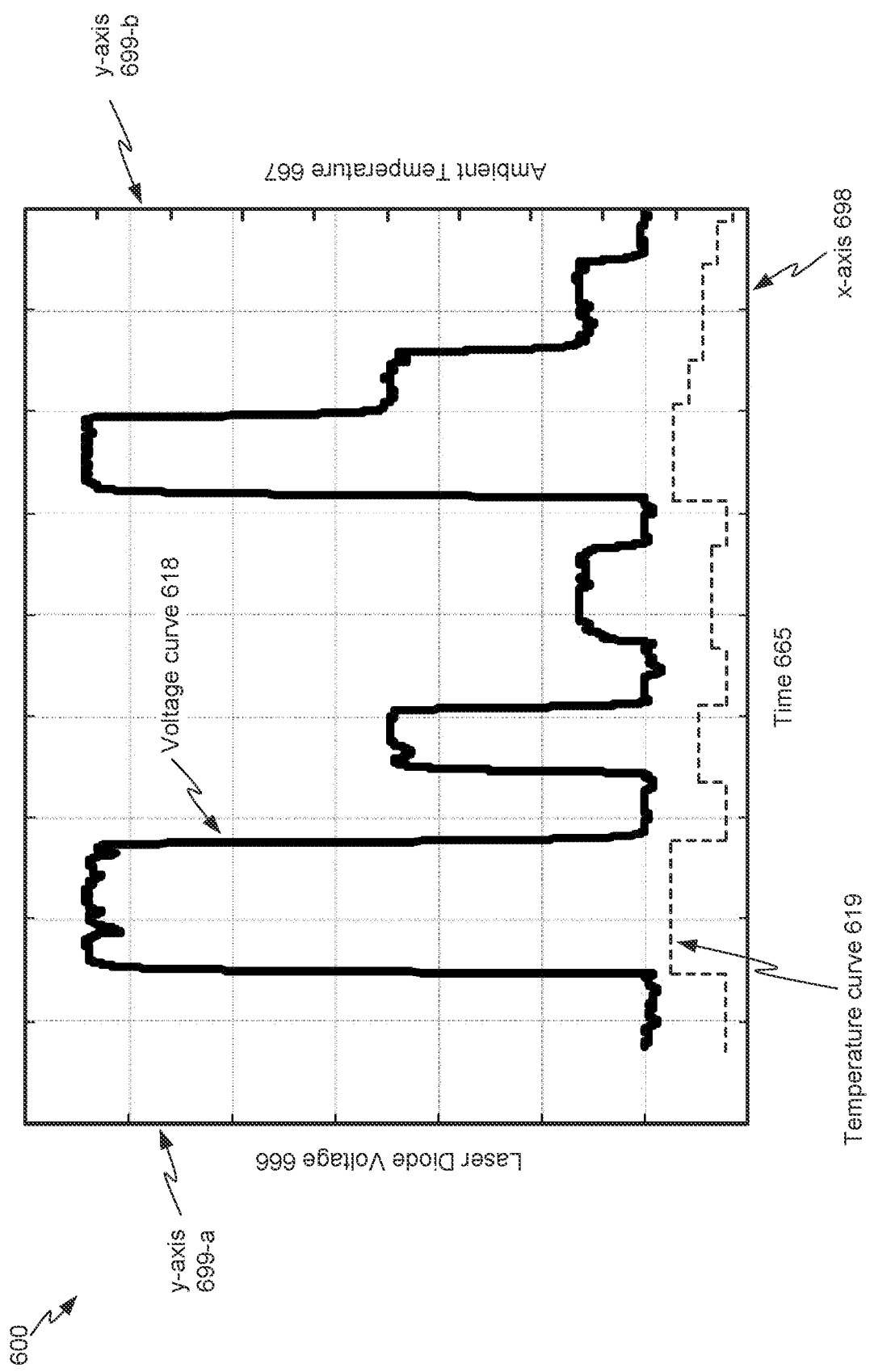
FIG. 6 illustrates a conceptual graph showing both laser diode voltage (or alternatively, laser diode resistance) and ambient temperature against time, according to various aspects of the disclosure.

FIG. 6 illustrates a conceptual graph 600 of LD voltage 666 (on vertical or y-axis 699-a) and ambient temperature 619 (on vertical or y-axis 699-b) against time 665 (on horizontal or x-axis 698), according to various aspects of the disclosure. In this example, the laser current is fixed, for instance, at a value below the laser threshold current, where the laser threshold current corresponds to a current at which the laser diode starts lasing. In other words, the laser current used to generate the plots in FIG. 6 does not result in any optical output from the laser diode (i.e., laser is in a non-lasing state). In some embodiments, an external heater may be utilized to vary the ambient temperature (depicted by 619) surrounding the laser diode. In some cases, when the current is kept constant, the LD voltage corresponds to the LD resistance, as is the case for conceptual graph 600. That is, in this example, the LD voltage 666 (on the y-axis 699-a) and the curve 618 may correspond to the resistance of the laser diode. As seen in FIG. 6, the LD resistance tracks the LD temperature well. In this way, aspects of the present disclosure enable the LD temperature to be estimated/measured by monitoring changes in the LD resistance. Furthermore, since the current passing through the laser diode is typically known, the LD resistance may be monitored by measuring the LD voltage.

Figure 7:
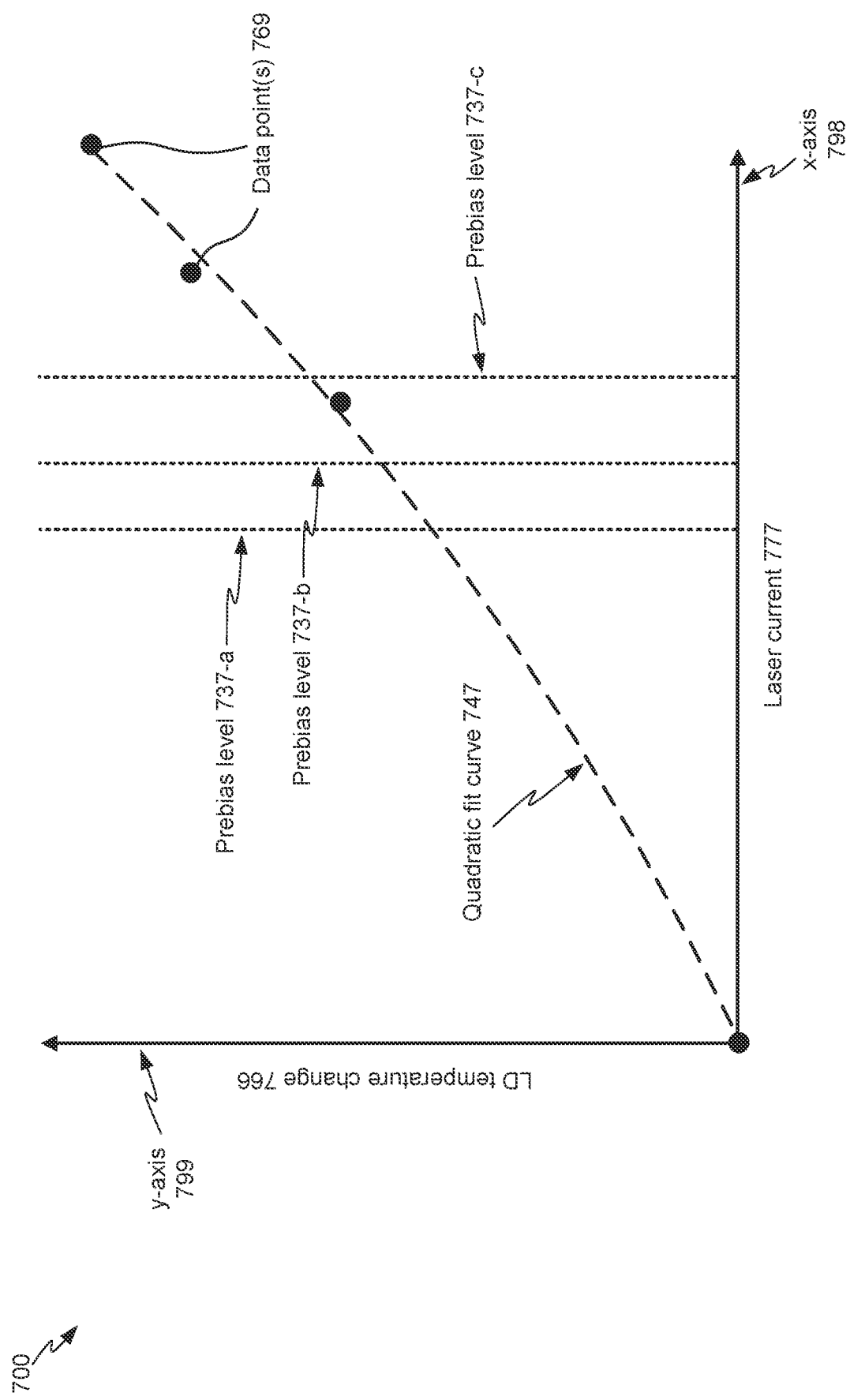
FIG. 7 illustrates a conceptual graph showing change in laser diode temperature as a function of laser current flowing through the laser diode, according to various aspects of the disclosure.

FIG. 7 illustrates a conceptual graph 700 showing laser diode temperature change 766 (on the vertical or y-axis 799) against laser current 777 (on the horizontal or x-axis 798), according to various aspects of the disclosure. Here, graph 700 depicts a plurality of data points 769 corresponding to LD temperature change values for different laser current values and a quadratic fit curve 747 passing through one or more of the data points 769.

FIG. 7 also depicts a plurality of prebias current levels, shown as prebias level 737-a, prebias level 737-b, and prebias level 737-c. In some cases, different operations of the disk drive may be performed at different laser power levels (e.g., 100% of a default value may be employed when user data is being written to the disk; 50-60% of the default value may be employed during a track seek). In some cases, each of the prebias levels 737 depicted in FIG. 7 may be below 100% of the default value. In one non-limiting example, prebias level 737-a may correspond to 40% of the default value, prebias level 737-b may correspond to 50% of the default value, and prebias level 737-c may correspond to 65% of the default value. As seen in FIG. 7, when a higher prebias level (e.g., prebias level 737-c instead of prebias level 737-a) is utilized, the change in the LD temperature is also higher. In other words, an increase in laser current causes a corresponding increase in the LD temperature.

In some embodiments, the LD temperature may be measured at different laser bias conditions (e.g., different prebias levels 737) and optionally used to create a lookup table (or another applicable data structure). In some embodiments, the LD temperature change 766 shown on the vertical or y-axis 799 may be derived from the estimated/measured LD resistance. Additionally, the LD resistance may be estimated or measured using the LD voltage, as described above in relation to FIG. 6. In one non-limiting example, the LD voltage corresponds to a voltage drop (or potential difference) between two nodes of the LD when a current flows through the LD. Since the current flowing through the LD is known/can be measured, the LD voltage can be utilized to estimate or measure the LD resistance, which in turn can be utilized to determine the LD temperature change. Additionally, or alternatively, the LD temperature change can be determined based at least in part on the calibration or sensitivity value, as described above in relation to FIGS. 4-5.

In some embodiments, a look up table (or another applicable data structure) can be created by monitoring the LD resistance for different laser current values. Additionally, or alternatively, a look up table can be created by monitoring the LD resistance at different temperatures (e.g., different ambient temperatures) and/or for different laser current values. For instance, as described above in relation to FIG. 6, the LD voltage and/or LD resistance are measured by varying the ambient temperature around the laser diode for a single laser current. In some cases, this process may be repeated for different laser current values to create the look up table, where the look up table comprises a relationship between the LD resistance/temperature, the LD current, and the ambient temperature. In this way, aspects of the present disclosure enable the LD resistance/temperature to be determined in real-time or substantially real-time for a given LD current and/or ambient temperature.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC), such as SoC 101 in FIG. 1B. In addition, the control circuitry 22 may include a preamp circuit, such as preamplifier 104 in FIG. 1B, where the preamp circuit is implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., shown in FIGS. 2C and 3) described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method(s), event(s), or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods (e.g., method 300) of this disclosure may include other steps or variations in various other embodiments. Some or all of any of method(s) 80 and/or 300 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for measuring laser diode temperature and predicting mode hops using laser diode resistance for data storage devices, such as HAMR drives, and other aspects of this disclosure. Persons skilled in the relevant fields of art will be well-equipped by this disclosure with an understanding and an informed reduction to practice of a wide panoply of further applications, architectures, techniques, and methods for measuring laser diode temperature and predicting mode hops using laser diode resistance for data storage devices, such as HAMR drives, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   a disk;
   an actuator arm assembly comprising a magnetic recording head;
   a laser diode; and
   one or more processing devices configured to:
      initiate a write operation, wherein the write operation is associated with a first temperature of the laser diode;
      determine self-heating induced by the laser diode for one or more of a transient condition and a steady-state condition of the laser diode, wherein determining the self-heating induced by the laser diode comprises measuring a resistance of the laser diode, and wherein the resistance corresponds to a temperature of the laser diode;
      detect, based at least in part on measuring the resistance, a change in the temperature of the laser diode relative to the first temperature; and
      in response to detecting the change, adjust the temperature of the laser diode during the write operation.

2. The data storage device of claim 1, wherein the one or more processing devices are further configured to measure the resistance of the laser diode in real-time or substantially real-time.

3. The data storage device of claim 1, wherein the temperature of the laser diode is based at least in part on a voltage across the laser diode and a laser current flowing through the laser diode.

4. The data storage device of claim 1, wherein the resistance of the laser diode is based at least in part on a laser current flowing through the laser diode.

5. The data storage device of claim 1, wherein, during the steady-state condition, the first temperature corresponds to a steady-state temperature associated with the write operation and when the laser diode is in a lasing state.

6. The data storage device of claim 1, wherein, during the transient condition, the temperature of the laser diode is different from the first temperature, wherein the first temperature corresponds to a steady-state temperature associated with the write operation.

7. The data storage device of claim 1, wherein adjusting the temperature comprises adjusting the temperature of the laser diode to prevent encountering one or more mode hops during the write operation.

8. The data storage device of claim 1, further comprising a preamplifier, and wherein prior to initiating the write operation, the one or more processing devices are further configured to:
apply, using the preamplifier, a reverse bias to the laser diode to preheat the laser diode such that the temperature is at or near the first temperature;
control transition of the preamplifier from applying the reverse bias to applying a forward bias to the laser diode; and
wherein a temperature of the laser diode is configured to stay the same or substantially the same after controlling the transition from the reverse bias to the forward bias for the laser diode.

9. The data storage device of claim 8, wherein, when the reverse bias is applied to the laser diode,
the laser diode is in a non-lasing state, and
no data writing or rewriting occurs.

10. The data storage device of claim 9, wherein applying the reverse bias comprises applying a negative voltage, and wherein a value of the negative voltages is kept below an avalanche or breakdown voltage for the laser diode.

11. The data storage device of claim 1, wherein the data storage device comprises a heat assisted magnetic recording (HAMR) data storage device, and wherein the one or more processing devices further comprise a system on chip (SoC), and wherein the one or more processing devices are further configured to:
calibrate firmware (FW) to allow measurement of the resistance of the laser diode, adjustment of the temperature of the laser diode, or a combination thereof.

12. A method of operating a data storage device, the method comprising:
initiating a write operation, wherein the write operation is associated with a first temperature of a laser diode;
determining self-heating induced by the laser diode for one or more of a transient condition and a steady-state condition of the laser diode, wherein determining the self-heating induced by the laser diode comprises at least measuring a resistance of the laser diode, and wherein the resistance corresponds to a temperature of the laser diode;
detecting, based at least in part on measuring the resistance, a change in the temperature of the laser diode relative to the first temperature; and
in response to detecting the change, adjusting the temperature of the laser diode during the write operation.

13. The method of claim 12, wherein the resistance of the laser diode is measured in real-time or substantially real-time, and wherein,
the temperature of the laser diode is based at least in part on a voltage across the laser diode and a laser current flowing through the laser diode.

14. The method of claim 12,
wherein:
during the steady-state condition, the laser diode is in a lasing state and the temperature of the laser diode is equal to or substantially equal to the first temperature;
during the transient condition, the temperature of the laser diode is different from the first temperature; and
the first temperature corresponds to a steady-state temperature associated with the write operation.

15. The method of claim 12, wherein adjusting the temperature comprises adjusting the temperature of the laser diode to prevent encountering one or more mode hops during the write operation.

16. The method of claim 12, wherein the data storage device comprises a heat assisted magnetic recording (HAMR) data storage device, the method further comprising:
calibrating firmware (FW) to allow one or more of the measurement of the resistance of the laser diode and adjustment of the temperature of the laser diode.

17. One or more processing devices comprising:
means for determining self-heating induced by a laser diode of a data storage device for one or more of a transient condition and a steady-state condition of the laser diode, wherein the means for determining the self-heating induced by the laser diode comprises at least means for measuring a resistance of the laser diode, and wherein the resistance corresponds to a temperature of the laser diode;
means for detecting, based at least in part on measuring the resistance, a change in the temperature of the laser diode relative to a first temperature; and
in response to detecting the change, means for adjusting the temperature of the laser diode.

18. The one or more processing devices of claim 17, wherein the means for measuring are configured to measure the resistance of the laser diode when a magnetic recording head of the data storage device is flying over a disk surface of a disk of the data storage device.

19. The one or more processing devices of claim 17, wherein the means for measuring are configured to measure the resistance of the laser diode when a magnetic recording head of the data storage device is parked on a ramp of the data storage device.

* * * * *